(12) United States Patent
Ku et al.

(10) Patent No.: US 11,595,101 B2
(45) Date of Patent: Feb. 28, 2023

(54) METHOD AND APPARATUS FOR REPORTING BEAM IN WIRELESS COMMUNICATION SYSTEM

(71) Applicant: LG Electronics Inc., Seoul (KR)

(72) Inventors: Gwanmo Ku, Seoul (KR); Sangwook Han, Seoul (KR)

(73) Assignee: LG Electronics Inc., Seoul (KR)

( * ) Notice: Subject to any disclaimer, the term of this patent is extended or adjusted under 35 U.S.C. 154(b) by 200 days.

(21) Appl. No.: 16/764,484

(22) PCT Filed: Nov. 24, 2017

(86) PCT No.: PCT/KR2017/013482
§ 371 (c)(1),
(2) Date: May 15, 2020

(87) PCT Pub. No.: WO2019/103196
PCT Pub. Date: May 31, 2019

(65) Prior Publication Data
US 2020/0358513 A1 Nov. 12, 2020

(51) Int. Cl.
H04B 7/06 (2006.01)
H04L 5/00 (2006.01)
H04W 24/10 (2009.01)

(52) U.S. Cl.
CPC ......... H04B 7/0695 (2013.01); H04B 7/0626 (2013.01); H04L 5/0051 (2013.01); H04W 24/10 (2013.01)

(58) Field of Classification Search
CPC ............... H04B 7/0695; H04B 7/0626; H04B 7/0632; H04B 7/0641; H04B 7/0645;
(Continued)

(56) References Cited

U.S. PATENT DOCUMENTS

2017/0104517 A1 4/2017 Kakishima et al.
2017/0207843 A1 7/2017 Jung et al.
(Continued)

FOREIGN PATENT DOCUMENTS

KR 1020160055086 A 5/2016

OTHER PUBLICATIONS

Huawei, HiSilicon, "DL beam management", 3GPP TSG RAN WG1 Meeting #88b, Apr. 3-7, 2017, R1-1704229.
(Continued)

Primary Examiner — Peter P Chau
(74) Attorney, Agent, or Firm — Dentons US LLP

(57) ABSTRACT

According to one embodiment of the present specification, a method by which a terminal can report beam information in a wireless communication system can be provided, and the method by which a terminal reports beam information comprises: obtaining information related with beam reporting from a base station; triggering beam reporting; receiving a signal related with beam reporting from the base station; measuring the signal related with beam reporting; and reporting the beam information to the base station based on the measured signal, wherein the beam information includes information on best beams among all available beams and the beam information can be reported based on reporting configuration.

18 Claims, 10 Drawing Sheets

(58) Field of Classification Search
CPC ............... H04B 7/0658; H04L 5/0051; H04L 5/0057; H04L 5/0023; H04W 24/10; H04W 48/16
See application file for complete search history.

(56) References Cited

U.S. PATENT DOCUMENTS

2018/0288645 A1* 10/2018 Lee ...................... H04B 7/0478
2019/0281534 A1*  9/2019 Yu ........................ H04J 11/0076
2020/0053607 A1*  2/2020 Ingale ............... H04W 36/0072

OTHER PUBLICATIONS

TCL, "Beam indication with low-overhead", 3GPP TSG-RAN WG1 #90bis, Oct. 9-13, 2017, R1-1717313.

* cited by examiner (a)  (b)

METHOD AND APPARATUS FOR
REPORTING BEAM IN WIRELESS
COMMUNICATION SYSTEM

This application is the National Stage filing under 35 U.S.C. 371 of International Application No. PCT/KR2017/013482, filed on Nov. 24, 2017, the contents of which is hereby incorporated by reference herein in its entirety.

TECHNICAL FIELD

The present disclosure relates to a wireless communication system, and more particularly, to a method and apparatus for reporting beam information.

BACKGROUND ART

An ultra-high frequency radio communication system using a millimeter wave (mmWave) is configured to operate at a center frequency in the range of several GHz to several tens of GHz. Due to the characteristics of the center frequency, a significant path loss may occur in a radio shadow area in the mmWave communication system. Considering the significant path loss, it is necessary to design accurate beamforming for signals transmitted to a terminal in the mmWave communication system. In addition, a method of reporting beam information and operating based on the beam information is also required.

DISCLOSURE

Technical Problem

An object of the present disclosure is to provide a method of reporting beam information.

Another object of the present disclosure is to provide a method of transmitting information on the best beam among a plurality of beams.

A further object of the present disclosure is to provide a reporting configuration method for reducing the amount of information transfer.

Technical Solution

In an aspect of the present disclosure, provided is a method of reporting beam information by a user equipment (UE) in a wireless communication system. The method may include obtaining, by the UE, information related with beam reporting from a base station, triggering beam reporting, receiving a signal related with beam reporting from the base station, measuring the signal related with beam reporting, and reporting the beam information to the base station based on the measured signal. The beam information may include information on best beams among all available beams, and the beam information may be reported based on a reporting configuration.

In another aspect of the present disclosure, provided is a UE for reporting beam information in a wireless communication system. The UE may include a receiver configured to receive a signal, a transmitter configured to transmit a signal, and a processor configured to control the receiver and the transmitter. The processor may be configured to obtain information related with beam reporting from a base station, trigger beam reporting, receive a signal related with beam reporting from the base station, measure the signal beam reporting related, and report the beam information to the base station based on the measured signal. The beam information may include information on best beams among all available beams, and the beam information may be reported based on a reporting configuration.

The following items may be commonly applied to the method and apparatus for reporting beam information in a wireless communication system.

According to an embodiment of the present disclosure, the reporting configuration may be configured with two bits. The UE may report the reporting configuration with the beam information to the base station, and the base station may restore the beam information based on the reporting configuration.

According to an embodiment of the present disclosure, when the reporting configuration has a first value, the beam information may include information of all measurement values on a first beam among the best beams, and information on other beams except the first beam among the best beams may include only differential offset information based on differences from the first beam.

According to an embodiment of the present disclosure, when the reporting configuration has a second value, the beam information may include information of all measurement values on a first beam among the best beams, and information on other beams except the first beam among the best beams may include only relative differential offset information based on differences between adjacent beams.

According to an embodiment of the present disclosure, when the reporting configuration has a third value, the measurement values of all the available beams may have a distribution with a plurality of crests, and the beam information may include information on only beams corresponding to the crests.

According to an embodiment of the present disclosure, the measurement values of all the available beams may be distributed based on beam indices, and each of the beams corresponding to the crests may have a higher measurement value than beams with adjacent beams indices on both sides.

According to an embodiment of the present disclosure, when the reporting configuration has a fourth value, the measurement values of all the available beams may have a distribution with a single crest, and the beam information may include information on only a beam corresponding to the crest, which has the highest measurement value.

According to an embodiment of the present disclosure, the total number of available beams and the number of best beams may be indicated by the information related with beam reporting.

According to an embodiment of the present disclosure, the information related with beam reporting may be information about a beam reporting mechanism, and the UE may obtain the information related with beam reporting in a system information block (SIB) or a higher layer signal.

According to an embodiment of the present disclosure, the signal related with beam reporting may be either a beam reference signal or a channel state information reference signal (CSI-RS).

Advantageous Effects

The present disclosure may provide a method of reporting beam information.

The present disclosure may provide a method of transmitting information on the best beam among a plurality of beams The present disclosure may provide a reporting configuration method for reducing the amount of information transfer.

It will be appreciated by persons skilled in the art that the effects that could be achieved with the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure.

BEST MODE

Figure 1:
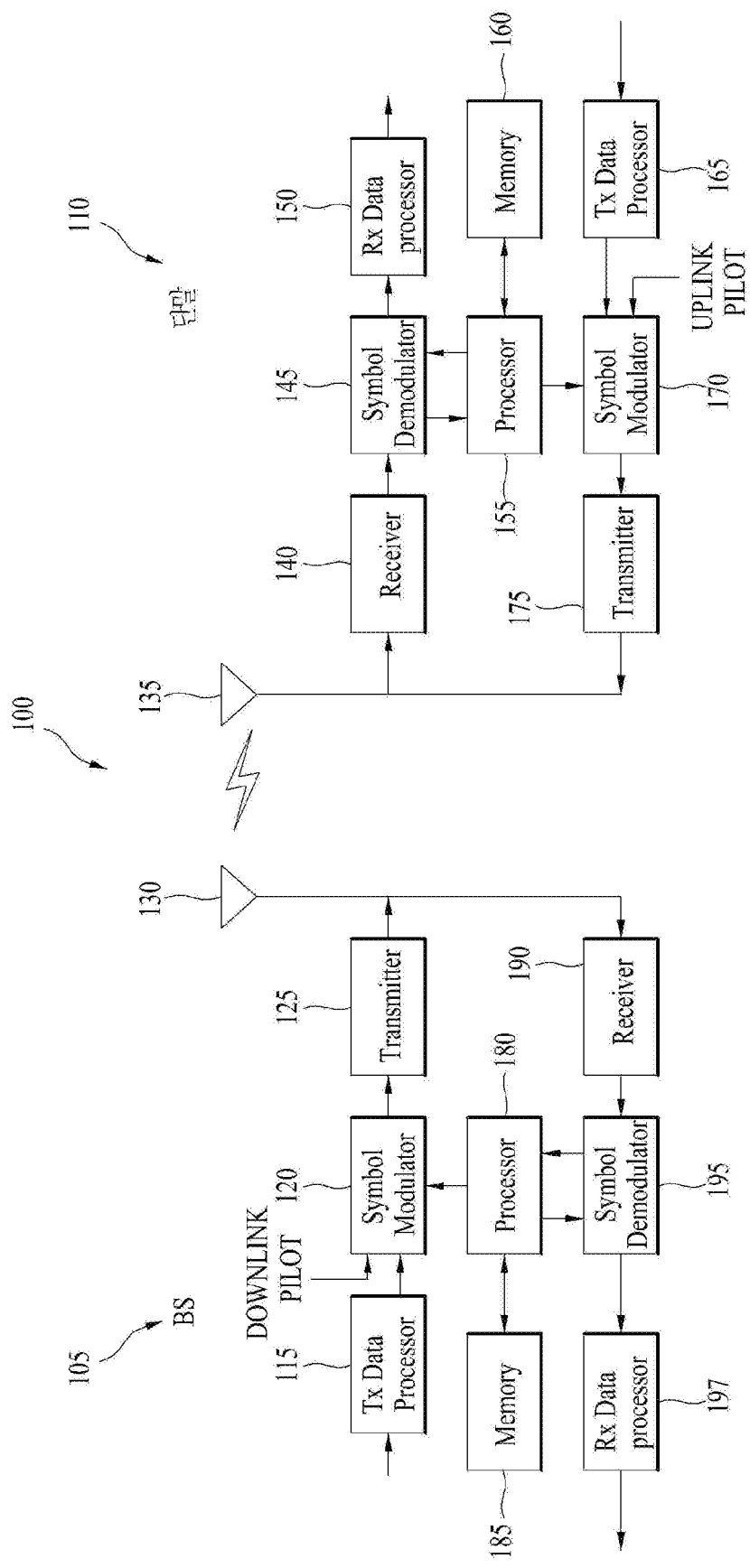
FIG. 1 is a block diagram showing configurations of a base station (BS) 105 and a user equipment (UE) 110 in a wireless communication system 100.

Reference will now be made in detail to the preferred embodiments of the present disclosure, examples of which are illustrated in the accompanying drawings. In the following detailed description of the disclosure includes details to help the full understanding of the present disclosure. Yet, it is apparent to those skilled in the art that the present disclosure can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present disclosure from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like.

In a mobile communication system, a UE may receive information in downlink and transmit information in uplink as well. Information transmitted or received by the UE may include various kinds of data and control information. In accordance with types and usages of the information transmitted or received by the UE, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access), 5G communication system and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA.

The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present disclosure. And, the use of the specific terminology can be modified into another form within the scope of the technical idea of the present disclosure.

Regarding wireless transmission between a BS and a UE, transmission from a BS to a UE is defined as DL transmission, and transmission from a UE to a BS is defined as UL transmission. A mode where radio resources for DL transmission are different from those for UL transmission is referred to as 'duplex mode'. In particular, a mode of performing transmission and reception bidirectionally by dividing time resources into DL transmission time resources and UL transmission time resources is referred to as 'time division duplex (TDD) mode', and a mode of performing transmission and reception bidirectionally by dividing frequency bands into DL transmission bands and UL transmission bands is referred to as 'frequency division duplex (FDD) mode'. It is apparent that the technology proposed in the present disclosure may operate not only in the FDD mode but also in the TDD mode.

FIG. 1 is a block diagram illustrating configurations of a BS 105 and a UE 110 in a wireless communication system 100.

Although one BS 105 and one UE 110 are shown in the drawing to schematically represent the wireless communication system 100, the wireless communication system 100 may include at least one BS and/or at least one UE.

Referring to FIG. 1, the BS 105 may include a transmission (Tx) data processor 115, a symbol modulator 120, a transmitter 125, a transmitting and receiving antenna 130, a processor 180, a memory 185, a receiver 190, a symbol demodulator 195, and a reception (Rx) data processor 197.

The UE 110 may include a Tx data processor 165, a symbol modulator 170, a transmitter 175, a transmitting and receiving antenna 135, a processor 155, a memory 160, a receiver 140, a symbol demodulator 155, and an Rx data processor 150. Although FIG. 1 shows that the BS 105 uses one transmitting and receiving antenna 130 and the UE 110 uses one transmitting and receiving antenna 135, each of the BS 105 and the UE 110 may include a plurality of antennas. Therefore, each of the BS 105 and the UE 110 according to the present disclosure can support the multi-input multi-output (MIMO) system. In addition, the BS 105 according to the present disclosure can also support both of the single user-MIMO (SU-MIMO) system and the multi-user-MIMO (MU-MIMO) system.

For DL transmission, the Tx data processor 115 receives traffic data, formats the received traffic data, codes the formatted traffic data, interleaves and modulates (or perform symbol mapping on) the coded traffic data, and provides modulated symbols (data symbols). The symbol modulator 120 provides a stream of symbols by receiving and processing the data symbols and pilot symbols.

The symbol modulator 120 performs multiplexing of the data and pilot symbols and transmits the multiplexed symbols to the transmitter 125. In this case, each of the transmitted symbols may be a data symbol, a pilot symbol or a zero value signal. In each symbol period, pilot symbols may be continuously transmitted. In this case, each of the pilot symbols may be a frequency division multiplexing (FDM) symbol, an orthogonal frequency division multiplexing (OFDM) symbol, or a code division multiplexing (CDM) symbol.

The transmitter 125 receives the symbol stream, converts the received symbol stream into one or more analog signals, adjusts the analog signals (e.g., amplification, filtering, frequency upconverting, etc.), and generates a DL signal suitable for transmission on a radio channel. Thereafter, the transmitting antenna 130 transmits the DL signal to the UE.

Hereinafter, the configuration of the UE 110 is described. The receiving antenna 135 receives the DL signal from the BS and forwards the received signal to the receiver 140. The receiver 140 adjusts the received signal (e.g., filtering, amplification, frequency downconversion, etc.) and obtains samples by digitizing the adjusted signal. The symbol demodulator 145 demodulates the received pilot symbols and forwards the demodulated pilot symbols to the processor 155 for channel estimation.

The symbol demodulator 145 receives a frequency response estimation value for DL from the processor 155, performs data demodulation on the received data symbols, obtains data symbol estimation values (i.e., estimation values of transmitted data symbols), and provides the data symbols estimation values to the Rx data processor 150. The Rx data processor 150 reconstructs the transmitted traffic data by demodulating (i.e., performing symbol demapping on), deinterleaving and decoding the data symbol estimated values. The processing performed by the symbol demodulator 145 and the Rx data processor 150 are complementary to that performed by the symbol modulator 120 and the transmission data processor 115 of the BS 105, respectively.

For UL transmission, the Tx data processor 165 of the UE 110 processes the traffic data and provides data symbols. The symbol modulator 170 receives the data symbols, performs multiplexing of the received data symbols, modulates the multiplexed symbols, and provides a stream of symbols to the transmitter 175. The transmitter 175 receives the symbol stream, processes the received stream, and generates an UL signal. The transmitting antenna 135 transmits the generated UL signal to the BS 105.

The BS 105 receives the UL signal from the UE 110 through the receiving antenna 130. The receiver 190 obtains samples by processing the received UL signal. Subsequently, the symbol demodulator 195 processes the samples and provides pilot symbols received in UL and data symbol estimation values. The Rx data processor 197 reconstructs the traffic data transmitted from the UE 110 by processing the data symbol estimation values.

The processor 155 of the UE 110 controls operations (e.g., control, adjustment, management, etc.) of the UE 110, and the processor 180 of the BS 105 controls operations (e.g., control, adjustment, management, etc.) of the BS 105. The processors 155 and 180 may be connected to the memory units 160 and 185 configured to store program codes and data, respectively. Specifically, the memory units 160 and 185, which are connected to the processors 155 and 180, respectively, store operating systems, applications, and general files.

Each of the processors 155 and 180 can be called a controller, a microcontroller, a microprocessor, a microcomputer or the like. In addition, the processors 155 and 180 can be implemented using hardware, firmware, software and/or any combinations thereof.

When the embodiments of the present disclosure are implemented using hardware, the processors 155 and 180 may be provided with application specific integrated circuits (ASICs), digital signal processors (DSPs), digital signal processing devices (DSPDs), programmable logic devices (PLDs), field programmable gate arrays (FPGAs), etc.

Meanwhile, when the embodiments of the present disclosure are implemented using firmware or software, the firmware or software may be configured to include modules, procedures, and/or functions for performing the above-explained functions or operations of the present disclosure. In addition, the firmware or software configured to implement the present disclosure is provided within the processors 155 and 180. Alternatively, the firmware or software may be saved in the memories 160 and 185 and then driven by the processors 155 and 180.

Radio protocol layers between a UE and a BS in a wireless communication system (network) may be classified as Layer 1 (L1), Layer 2 (L2), and Layer 3 (L3) based on three lower layers of the open system interconnection (OSI) model well known in communication systems. A physical layer belongs to the L1 layer and provides an information transfer service via a physical channel. A radio resource control (RRC) layer belongs to the L3 layer and provides control radio resources between a UE and a network. That is, a BS and a UE may exchange RRC messages through RRC layers in a wireless communication network.

In the present specification, since it is apparent that the UE processor 155 and the BS processor 180 are in charge of processing data and signals except transmission, reception, and storage functions, they are not mentioned specifically for convenience of description. In other words, even if the processors 155 and 180 are not mentioned, a series of data processing operations except the transmission, reception, and storage functions can be assumed to be performed by the processors 155 and 180.

Figure 2:
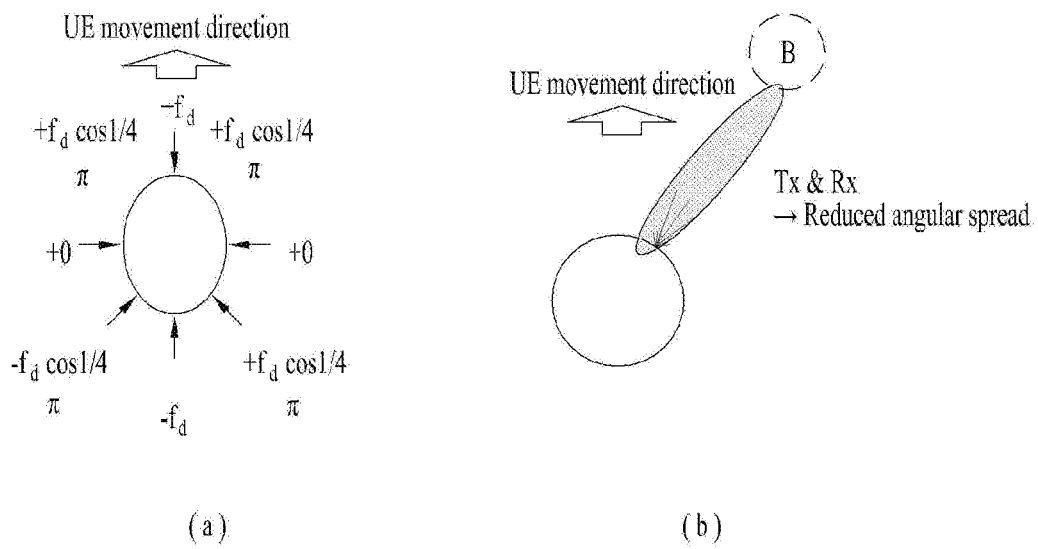
FIG. 2 is a diagram illustrating narrow beamforming related to the present disclosure.
Figure 3:
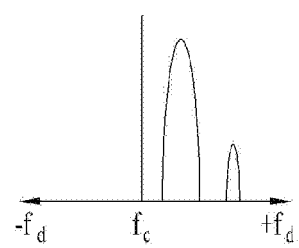
FIG. 3 is a diagram illustrating a Doppler spectrum when narrow beamforming is performed.

FIG. 2 is a diagram illustrating narrow beamforming related to the present disclosure, and FIG. 3 is a diagram illustrating a Doppler spectrum when the narrow beamforming is performed.

In the ultra-high frequency wireless communication system, since the center frequency is located at a very high band, the size of an antenna may be reduced, and an antenna array including a plurality of antennas may be installed in a small space. This feature may enable pin-point beamforming, pencil beamforming, narrow beamforming, or sharp beamforming, which is based on several tens of antennas to several hundreds of antennas. The narrow beamforming may mean that a signal is received at a certain angle rather than in a constant direction.

FIG. 2(a) illustrates that the Doppler spectrum is represented in the form of U-shape based on a signal received in a constant direction, and FIG. 2(b) illustrates that the narrow beamforming is performed using a plurality of antennas.

When the narrow beamforming is performed, angular spread is reduced, and thus, the Doppler spectrum becomes narrower than the U-shape. It may be seen from FIG. 3 that Doppler spread occurs at a certain frequency band in the Doppler spectrum when the narrow beamforming is performed.

As described above, a wireless communication system using ultra-high frequency bands may operate at a center frequency in the range of several GHz to several tens of GHz. The characteristics of the center frequency may further worsen the Doppler effected generated by the movement of a UE or the impact of a carrier frequency offset due to a difference between a transmitter oscillator and a receiver oscillator.

Figure 4:
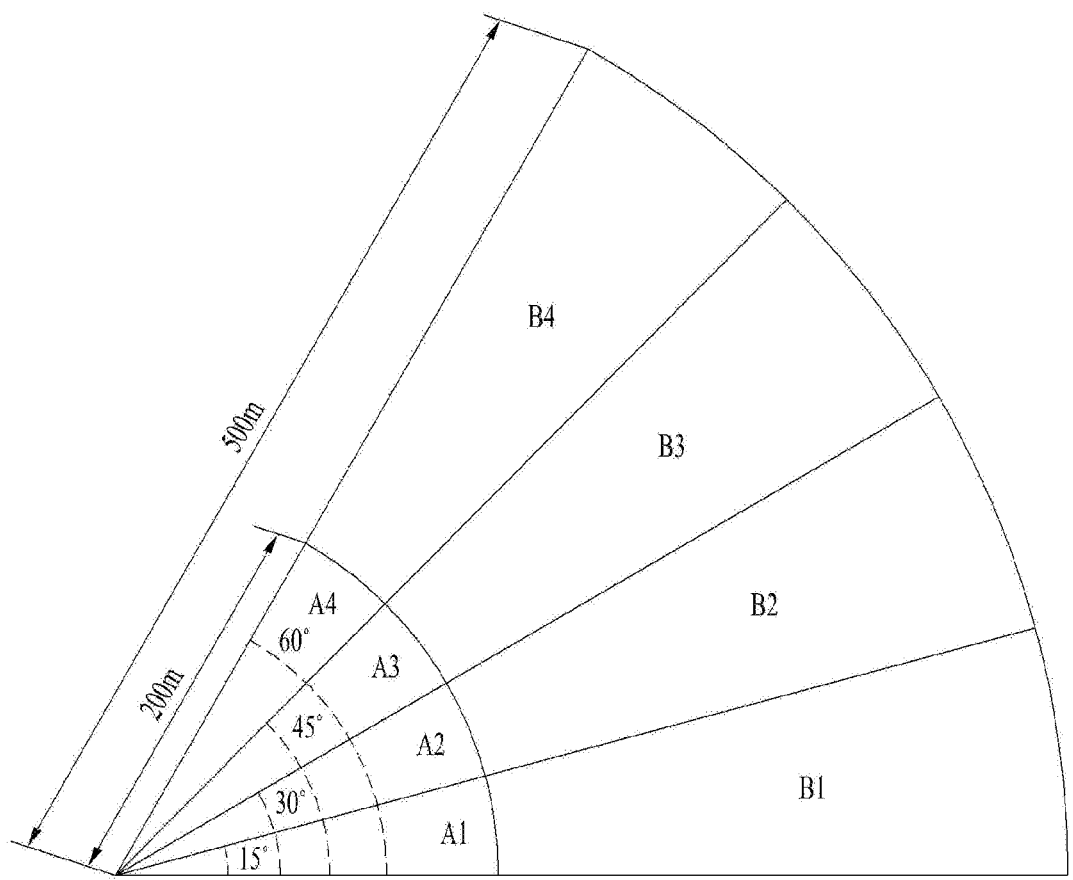
FIG. 4 is a diagram illustrating a synchronization signal service area of a BS.

FIG. 4 is a diagram illustrating a synchronization signal service area of a BS.

A UE may perform synchronization with a BS based on a downlink (DL) synchronization signal transmitted from the BS. In such a synchronization process, timing and frequency are synchronized between the BS and the UE. During the synchronization process, the BS may transmit the synchronization signal by setting a beam width as wide as possible in order for UEs in a specific cell to receive and use the synchronization signal.

The mmWave communication system using high frequency bands may have a high path loss, compared to when low frequency bands are used for synchronization signal transmission. That is, the cell radius supported by a system using high frequency bands is significantly lower than that of a legacy cellular system (e.g., LTE/LTE-A) using low frequency bands (e.g., frequency band below 6 GHz).

As a method for overcoming the reduction of the cell radius, it may be considered that the synchronization signal is transmitted based on beamforming. When beamforming is used, the cell radius may increase but the beam width may decrease. Equation 1 below shows variation in the SINR of a received signal depending on the beam width.

$$W \rightarrow M^{-2} W$$

$$SINR \rightarrow M^2 SINR \qquad \text{[Equation 1]}$$

Equation 1 shows that the received SINR increases (by $M^2$ times) when the beam width is reduced by $M^{-2}$ times by the beamforming.

As another method for overcoming the reduction of the cell radius, it may also be considered that the same synchronization signal is repeatedly transmitted. Although additional resources need to be assigned in the time domain, this method has an advantages in that the cell radius may increase with no decrease in the beam width.

The BS allocates resources to each UE by scheduling frequency and time resources located in a specific section. In the following, such a specific section is be defined as a sector. In FIG. 4, A1, A2, A3, and A4 represent sectors with a radius of 0 to 200 m and widths of 0 to 15°, 15 to 30°, 30 to 45°, and 45 to 60°, respectively. B1, B2, B3, and B4 represent sectors with a radius of 200 to 500 m and widths of 0 to 15°, 15 to 30°, 30 to 45°, and 45 to 60°, respectively. Based on the structure shown in FIG. 4, sector 1 and sector 2 are defined as {A1, A2, A3, A4} and {A1, A2, A3, A4, B1, B2, B3, B4}, respectively. It is assumed that when the current synchronization signal service area of the BS is sector 1, the BS requires additional power of 6 dB or more to provide the synchronization signal to sector 2.

To service sector 2, the BS may obtain an additional gain of 6 dB from beamforming. The BS may increase the service radius from A1 to B1 by performing the beamforming. However, since the beamforming decreases the beam width, the BS may not serve A2, A3, and A4 at the same time. Thus, when the beamforming is performed, the synchronization signal needs to be transmitted separately to sectors A2 and B2, sectors A3 and B3, and sectors A4 and B4. In other words, the BS needs to perform the beamforming and transmit the synchronization signal four times to service sector 2.

In the above repeated synchronization signal transmission, although the BS may transmit the synchronization signal to the entirety of sector 2, the BS needs to transmit the synchronization signal in the time domain four times repeatedly. Consequently, resources required to service sector 2 are the same for both the beamforming scheme and the repeated transmission scheme.

In the case of the beamforming scheme, if a UE moves at a high speed or is located at the boundary of a sector, it is difficult for the UE to receive the synchronization signal stably since the beam width narrows. However, if the UE is capable of identifying the ID of a beam on which the UE is located, the UE may recognize its location from the synchronization signal. In the case of the repeated transmission scheme, the UE may not miss the synchronization signal since the beam width widens. However, the UE is incapable of recognizing its location.

Figure 5:
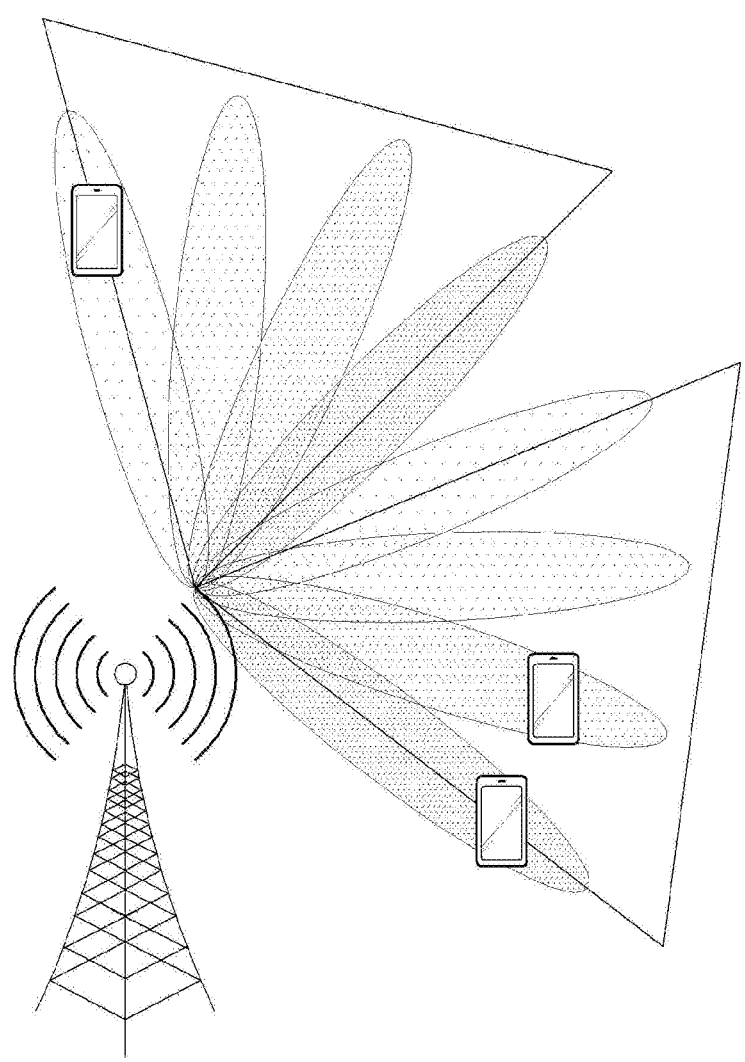
FIG. 5 is a diagram illustrating a method for a BS and UEs to exchange signals based on beamforming.

FIG. 5 is a diagram illustrating a method for a BS and UEs to exchange signals based on beamforming.

As described above, a BS (e.g., gNB) may exchange a signal with a UE based on beamforming in the new radio access technology (NR) and mmWave systems. For example, the BS may configure a beam in a specific direction, and UEs located in the beam direction may communicate with the BS through the beam as shown in FIG. 5.

In this case, beam information needs to be reported in order for the BS and UEs to configure beams. For example, a beam reporting mechanism may be considered in the NR and mmWave system. According to the beam reporting mechanism, each in-coverage UE may receive a reference signal (RS) (e.g., beam RS, channel state information reference signal (CSI-RS), etc.) from the BS. Each UE may report a plurality of best beams. In the beam reporting mechanism, one representative value (e.g., a median value or a peak value) may be first transmitted as a reference value for overhead reduction. For other reporting values, differential offsets from the representative value may be reported. However, if there are values over the range defined by the offsets or values that cannot be represented by the offsets, an error may occur in terms of accuracy. Although the UE may recognize the error, the BS may not recognize that the error is reported. In addition, since the UE needs to report measurements as many as the number of reported beams for values within the range, i.e., the UE should send reports on a plurality of beams, overhead may increase in proportional to the number of beams.

Hereinafter, a description will be given of a method of reducing overhead by considering correlation statistics between beams based on beam characteristics in the mmWave system. That is, a new beam management mechanism will be described in consideration of the correlation statistics based on the features of the NR and mmWave systems.

Figure 6:
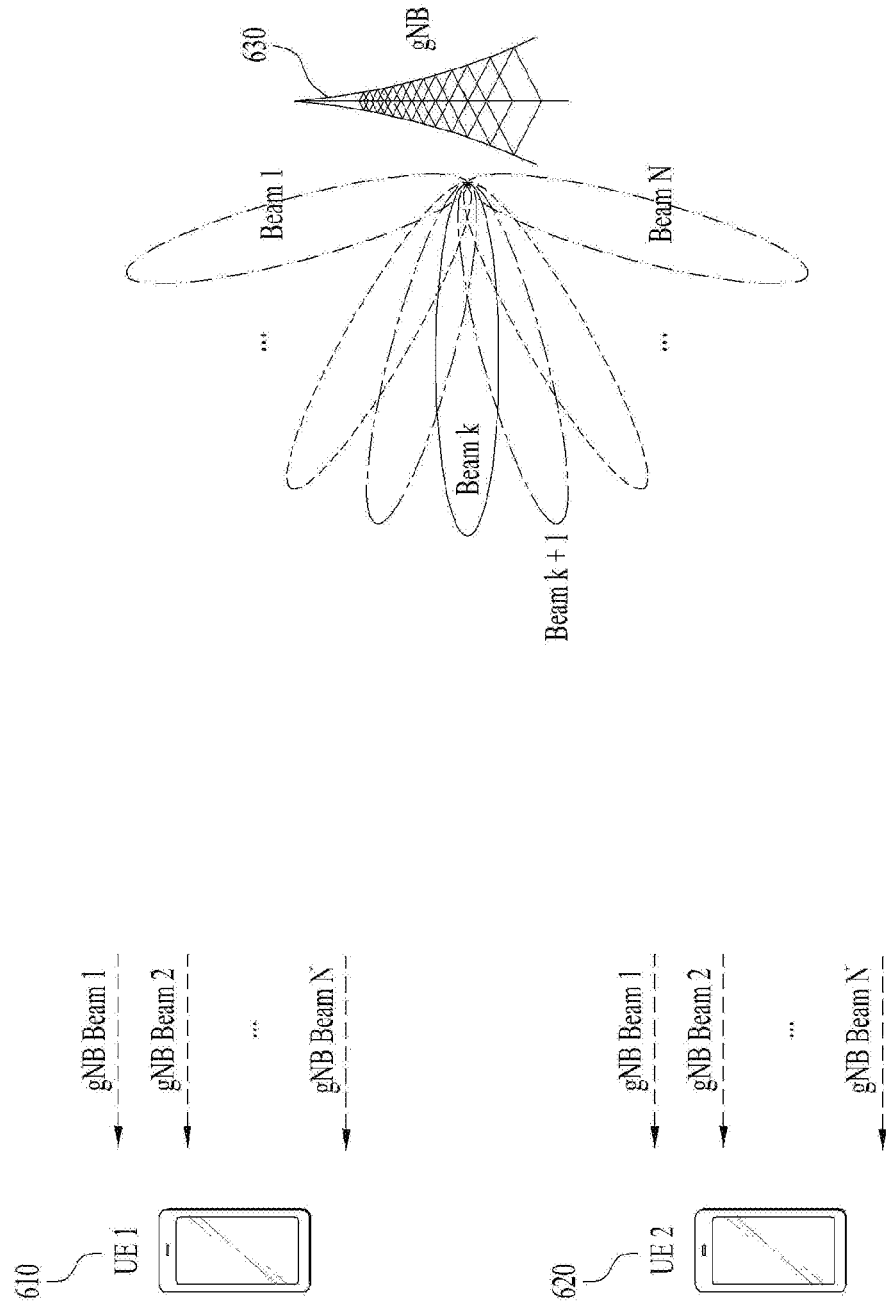
FIG. 6 is a diagram illustrating a method for a BS and UEs to exchange signals based on beamforming.

FIG. 6 is a diagram illustrating a beam reporting mechanism.

As described above, an overhead reduction method may be required when beam are reported in the NR and mmWave systems. That is, a beam reporting mechanism capable of reducing overhead in consideration of beam reporting and allowing a BS to accurately obtain beam reporting values from a UE may be required.

Referring to FIG. 6, UEs 610 and 620 may receive an RS for beam measurement (e.g., beam RS, CSI-RS, etc.) on each antenna port from a BS (gNB) 630 and then perform measurement. The UEs 610 and 620 may decode a measurement received on each antenna port. After checking beam IDs predefined between the BS 630 and the UEs 610 and 620, the UEs 610 and 620 may report M best beams among N beams. The number of measured beams may be N, and the number of best beams may be M. In this case, the values of N and M may be randomly determined and vary depending on situations.

For example, when a UE reports M best beams, the UE may report information that is M times greater than UE beam reporting information. The reporting information may be represented by the sum of bits for indicating a beam ID and bits for indicating a measurement per beam.

For example, it is assumed that there are a total of N beams (N=32) and M best beams (M=6) are reported based on a representative value and different offsets in the NR system. In this case, 4-bit wideband reporting may be configured for the best value, i.e., the representative value. In addition, a 3-bit different offset may be used (M−1) times to report the M best beams.

The feedback overhead required to report the M best beams may be calculated as shown in Equation 2.

$$M*[\log_2 N]+4+(M-1)*3=49$$

Specifically, referring to FIG. 6, the BS 630 may form a total of N beams. Each of the UEs 610 and 620 may configure M best beams among the N beams by considering the location thereof and other elements. In addition, each of the UEs 610 and 620 may report the M best beams to the BS 630 based on Equation 2.

In this case, a method of reducing overhead in Equation 2 in consideration of the features of the NR and mmWave systems may be required. In other words, a beam reporting procedure for reducing the number of bits reported by each of the UEs 610 and 620 and improving the decoding accuracy of the BS 630 may be required. Hereinafter, the beam reporting procedure will be described in detail.

Figure 7:
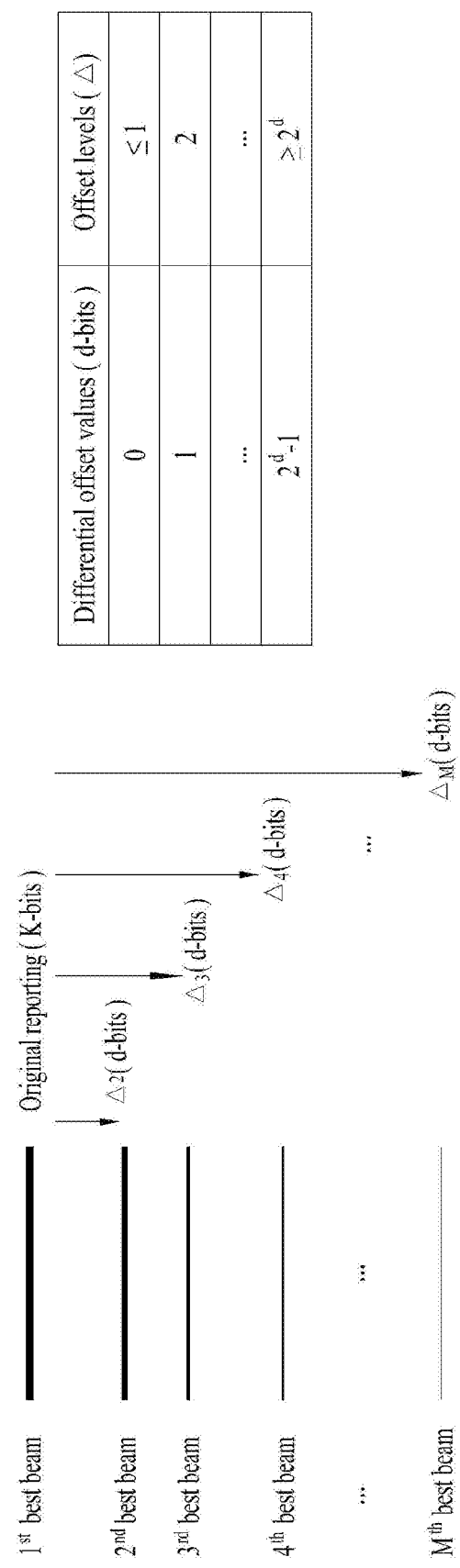
FIG. 7 is a diagram illustrating a method of performing beam reporting based on differential offsets.

FIG. 7 is a diagram illustrating a method of reporting best beams.

As described above, a UE may report M best beams among a total of N beams to a BS. Each of the M best beams may refer to an optimal beam suitable for use at the UE. The BS may select a beam for communicating with the UE based on the best beam information.

According to the method of reporting the best beams shown in FIG. 7, the first best beam may be reported at an original measurement level (k bits) as in wideband reporting. That is, for one of the best beams, all measurement information may be considered and then reported by allocating a large number of bits. For the remaining beams (i.e., second to M-th beams), information on differences from the first beam may be represented by bits, and only the information may be transmitted. Specifically, for the remaining (M−1) beams, the information on the differences from the first beam may be represented by "d bits" and then transmitted as shown in FIG. 7. In this case, the differential offset value of "d bits" may vary depending on offset levels. The number of bits may increase as the difference from the first best beam increases. Thus, the second beam closest to the first beam may have a small offset value of "d bits", and the M-th beam farthest from the first beam may have a large offset value of "d bits".

In this case, a relative differential offset value may be used instead of the offset value of "d bits" which indicates the difference from the first beam. Assuming that the relative differential offset value is "r" and the differential offset value is "d", "r<d" may be satisfied.

Figure 8:
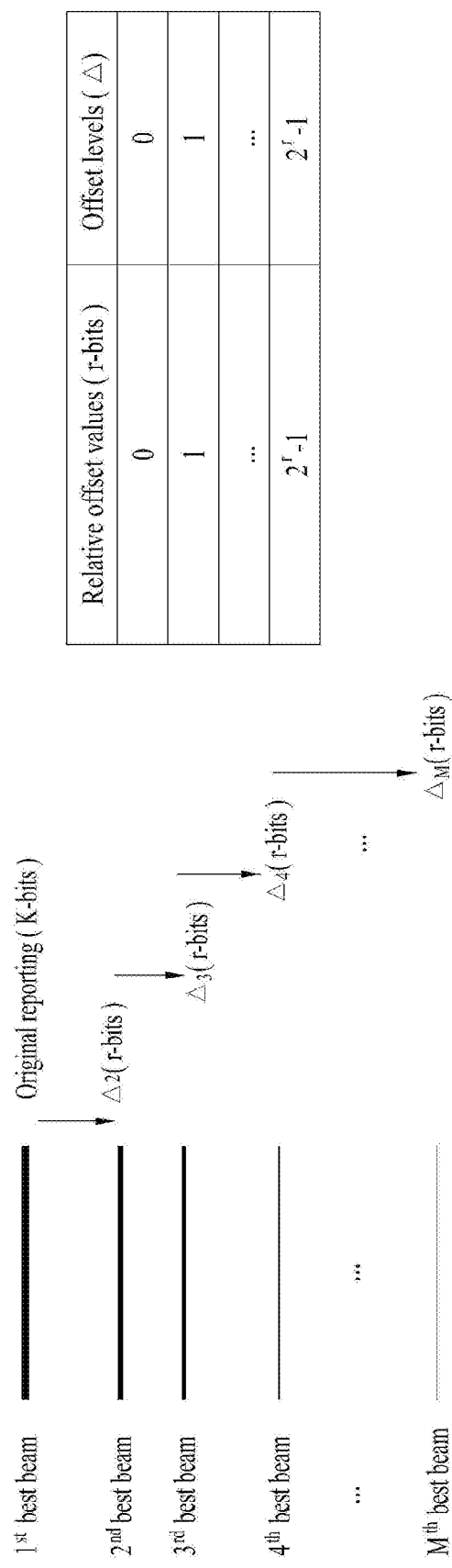
FIG. 8 is a diagram illustrating a method of performing beam reporting based on relative differential offsets.

Considering that the overhead may be reduced by the characteristics of ranking/ordering when the M best beams are reported, the relative differential offset value may be applied as shown in FIG. 8.

Referring to FIG. 8, the first best beam may be reported at the original measurement level (k bits) as in wideband reporting as described above. For the second best beam, a difference from the first best beam may be reported by "r bits". For the third best beam, a difference from the second best beam rather than a difference from the first beam may be reported by "r bits". In this way, for an M-th best beam, a difference from an (M−1)-th best beam may be reported by "r bits". The relative offset value of "r bits" may vary depending on offset levels. Here, "r bits" indicating information on a difference between two adjacent best beams may be smaller than "d bits" indicating information on a difference from the first best beam. That is, the number of bits reported by the UE may be reduced.

Figure 9:
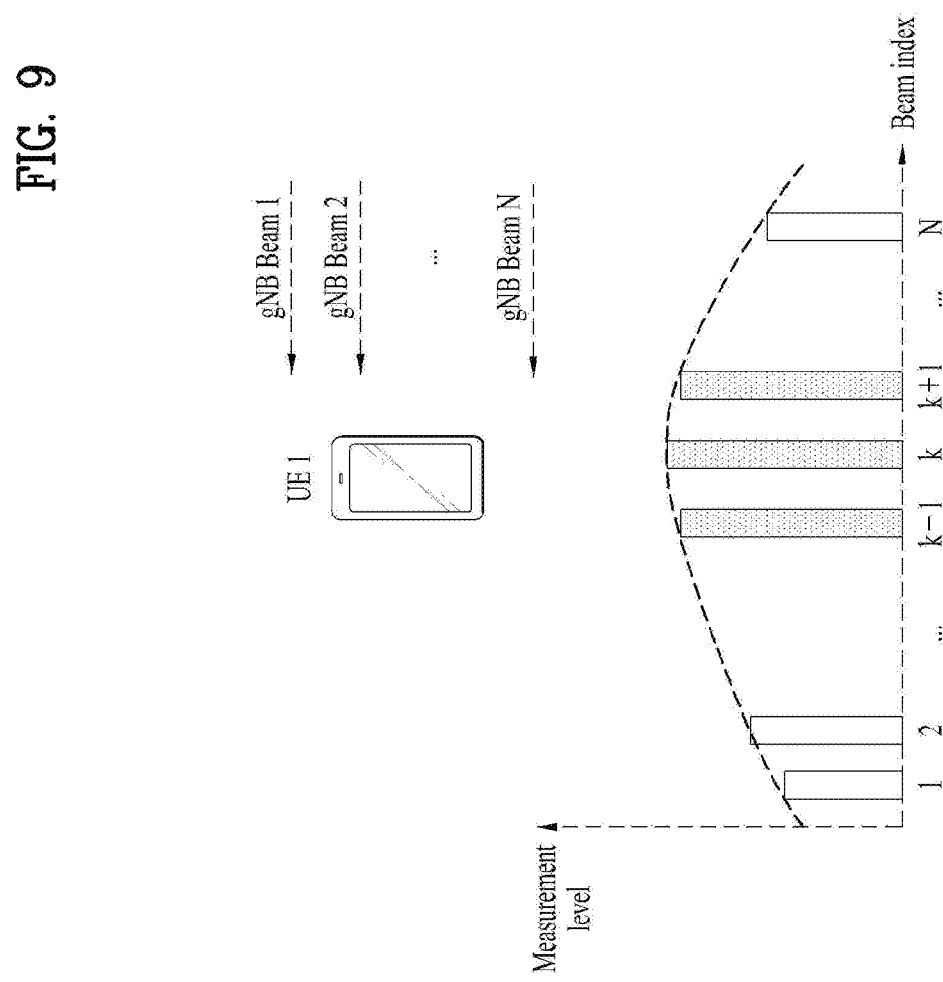
FIG. 9 is a diagram illustrating a method of performing beam reporting based on the measurement value of each beam.

As another example, referring to FIG. 9, a method of reducing feedback overhead based on correlation characteristics may be provided. Specifically, a correlation level may indicate whether adjacent beam IDs are in a range of levels (1c) represented by correlation. The correlation level may be provided by the BS or predefined for the UE.

Specifically, beam correlation may be distributed with respect to the index of a K-th beam as shown in FIG. 9. In this case, the best beam located at a single crest may be regarded as an original measurement level, i.e., a reference value. A BS may design beam reporting on the assumption that adjacent beams are best beams. Here, a crest may mean the peak of a distribution. That is, the crest may refer to a place where the measurement for a specific beam index is greater than those for adjacent beam indices. For example, the measurement for the K-th beam index may be greater than those for (K−1)-th and (K+1)-th beam indices. From the (K−1)-th beam index, the measurement may decrease as the beam index decrease, and from the (K+1)-th beam index, the measurement may decrease as the beam index increases. That is, the crest may mean the peak of the distribution.

Referring to FIG. 9, the K-th beam may correspond to a reference beam. Since the distribution has a crest where the measurement level is highest at the K-th beam and decreases toward both sides, beams close to the K-th beam may be the best beams. The beam reporting may be designed based thereon.

Figure 10:
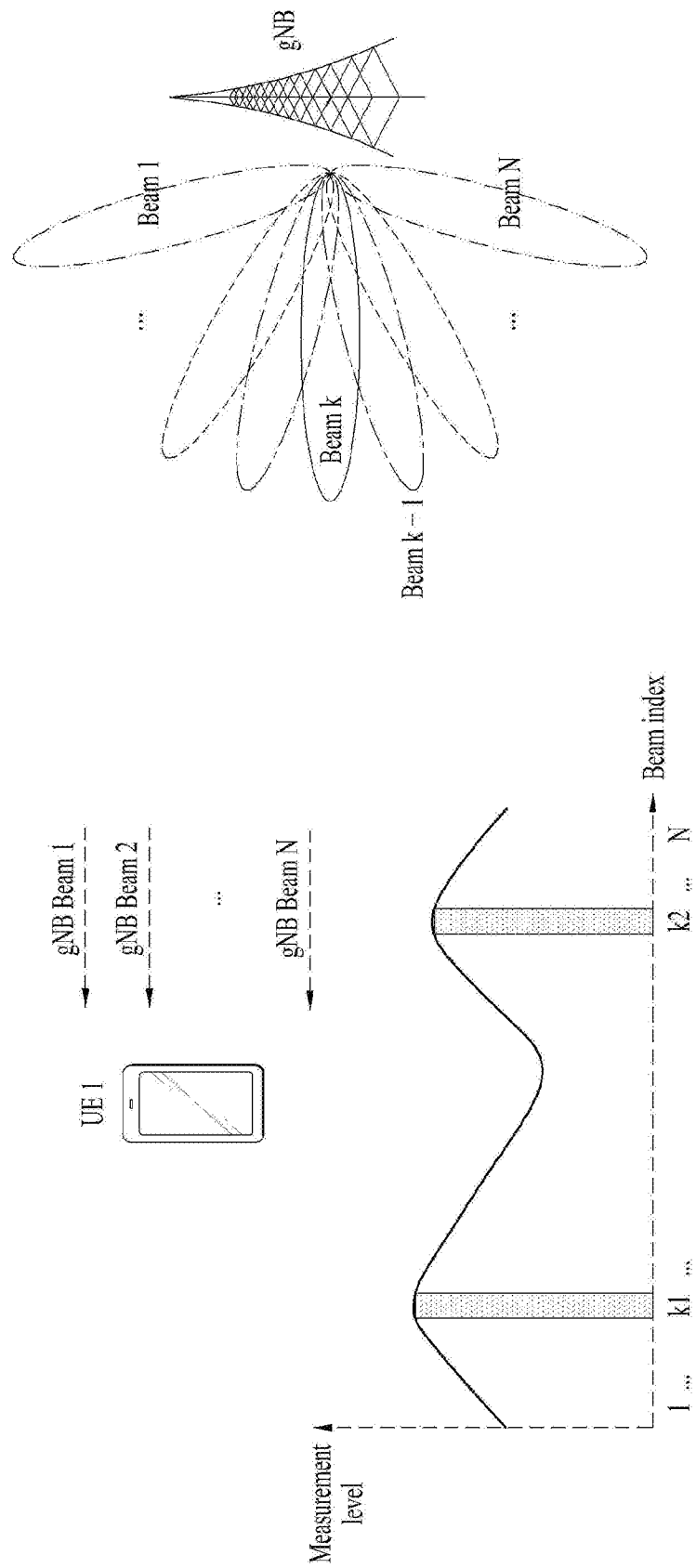
FIG. 10 is a diagram illustrating a method of performing beam reporting based on the measurement value of each beam.

Referring to FIG. 10, the measurement levels of beams may be distributed with double crests. In FIG. 10, relatively high measurements may be measured at K1-th and K2-th beam indices. That is, the distribution has double crests. A UE may design a beam reporting mechanism based on relative offset values by regarding K1-th and K2-th beams as reference values. By doing so, the number of bits required for beam reporting may be reduced.

Embodiment

A BS may share the above-described information with a UE for a beam reporting mechanism. For example, the BS may transmit the above-described information to the UE in a system information block (SIB) or a higher layer signal. The information shared between the BS and UE may include at least one of the total number of available beams (N), the number of best beams (M), a beam correlation level ($l_c$), a differential offset value (d), and a relative differential offset value (r).

The total number of beams (N) may correspond to the total number of beams configured between the BS and UE. The number of best beams (M) may be the number of beams that the UE needs to report to the BS, i.e., the number of beams preferred by the UE. That is, the UE may report M beams to the BS in order of preference.

The differential offset value may correspond to bit(s) for reporting a difference between the first best beam and each best beam. For example, Table 1 below shows differential offset values when d is 3. The differential offset value may vary depending on offset levels.

TABLE 1

| Differential offset value | Offset level |
|---|---|
| 0 | ≤1 |
| 1 | 2 |
| ... | ... |
| 7 | ≥8 |

The relative differential offset value may correspond to bit(s) for reporting a difference between adjacent best beams. In this case, the relative differential offset value may be smaller than the differential offset value (r<d). For example, Table 2 below shows differential offset values when r is 2. The relative differential offset value may vary depending on offset levels. However, since the relative differential offset value is used to report the difference between adjacent best beams, the relative differential offset value may be smaller than the differential offset value.

TABLE 2

| Relative differential offset value | Offset level |
|---|---|
| 0 | 0 |
| 1 | 1 |
| 2 | 2 |
| 3 | 3 |

The correlation level ($l_c$) may be configured differently based on correlation between beams.

The UE may establish reporting configurations to report beam information based on the above-described information as shown in Table 3. For example, the reporting configuration may be indicated by two bits. "00" indicates a reporting configuration where there is no correlation and differential offset values are used. "01" may indicate a reporting configuration where there is no correlation and relative differential offset values are used. "10" may indicate a reporting configuration where there is correlation between beams and each beam is reported based on a multi-crest distribution. "11" may indicate a reporting configuration where there is correlation between beams and each beam is reported based on a single-crest distribution.

TABLE 3

| value | Reporting Configuration |
|---|---|
| 00 | Non-correlated, differential |
| 01 | Non-correlated, relative differential |
| 10 | Correlated beams with multiple crests |
| 11 | Correlated beams with single crest |

When the BS and UE share information on a beam reporting mechanism, the BS may trigger the beam reporting mechanism by transmitting system information or a specific control signal to the UE.

Upon receiving information on beam reporting, the UE may trigger the beam reporting and then measure a signal received from the BS. In this case, the signal may correspond to the above-described RS, but the present disclosure is not limited thereto. At least one of reference signal received power (RSRP), reference signaling received quality (RSRQ), and channel quality information (CQI), which are defined by the reporting mechanism, may be used for the measurement. However, the present disclosure is not limited thereto. That is, other values may also be used for the measurement. The UE may configure the reporting mechanism based on the measurement. In this case, the configured reporting mechanism may be performed according to the above-described reporting configuration.

For example, it is assumed that a measurement report has a size of four bits, there are 32 beams (N=32), and 6 best beams (M=6) are reported. However, the numerals are merely exemplary, and the present disclosure is not limited thereto.

The correlation level ($l_c$) between beams may indicate strong correlation where the M best beams are formed around one beam while having wide ranges or weak correlation where the M best beams are around two or more beams while having narrow ranges. That is, the correlation level may correspond to information based on a beam distribution, but the present disclosure is not limited thereto.

When Reporting Configuration is "00"

When the reporting configuration is "00", there may be no correlation and differential offset values may be used as described above.

When the M best beams have general independent measurement characteristics with no beam correlation characteristics, for example, no single or double crests, the UE may report beam information based on the above reporting configuration. In this case, the differential offset values of the M best beams may not be represented by relative differential offset values. Thus, the index of the reporting configuration is set to "00", and the differential offset values are used to report the beam information to the BS.

For example, it is assumed that the beam indices of 6 best beams are [10, 30, 12, 1, 5, 4] and the measurement levels thereof are [15, 13, 7, 6, 5, 3]. In this case, since each best beam has no correlation characteristics and there is a value greater than a relative differential offset value between the second and third beams (13−7=6), it is difficult to use relative differential offset values.

Thus, the reporting configuration may be set to "00", and the differential offset values may be reported with no correlation as shown in Table 4 below.

Specifically, each beam ID may be allocated with a size of 5 bits based on the beam index. In a reporting method based on measurements, the first best beam may be allocated with a size of four bits as the original measurement level. The differential offset value may be calculated for the second to sixth beams. The offset levels of the beams may be 2, 8, 9, 10, and 12, respectively. Thus, according to Table 1, the differential offset values may be set to 1, 7, 7, 7, and 7, respectively. That is, 5*3 bits may be allocated.

Table 4 below is merely exemplary, and the present disclosure is not limited thereto. That is, the numerals therein may be changed.

TABLE 4

- Beam indices: [10, 30, 12, 1, 5, 4]
- Beam ID: Each beam ID is 5 bits
- Reporting [15, 13, 7, 6, 5, 3] :
    o 1 best beam [15] –> 1111 (4 bits)
    o 5 Differential Offsets [13, 7, 6, 5, 3]
        [15-13, 15-7, 15-6, 15-5, 15-3]=[2, 8, 9, 10, 12] –> [1, 7, 7, 7, 7]
        5*3 bits When Reporting Configuration is "01"

When the reporting configuration is "01", there may be no correlation and relative differential offset values may be used as described above.

When differences between the M best beams are always smaller than 2^r with no beam correlation characteristics, for example, no single or double crests, the UE may set the reporting configuration to "01". That is, when the differences are smaller than 2^r, reporting a relative differential offset value may reduce the number of bits. Thus, the relative differential offset value may be preferred. For example, assuming the beam indices of 6 best beams are [10, 30, 12, 1, 5, 4] and the measurement levels thereof are [15, 12, 10, 7, 5, 3], transmission may be performed based on relative differential offsets as shown in Table 5 below.

Specifically, each beam ID may be allocated with a size of 5 bits based on the beam index. In a reporting method based on measurements, the first best beam may be allocated with a size of four bits as the original measurement level. The relative differential offset value may be calculated for the second to sixth beams. The offset levels of the beams may be 3, 2, 3, 2, and 2, respectively. Thus, according to Table 2, the relative differential offset values may be set to 3, 2, 3, 2, and 2, respectively. That is, 5*2 bits may be allocated. Table 5 below is merely exemplary, and the present disclosure is not limited thereto. That is, the numerals therein may be changed.

TABLE 5

- Beam indices: [10, 30, 12, 1, 5, 4]
- Beam ID: Each beam ID is 5 bits
- Reporting [15, 12, 10, 7, 5, 3] :
    o 1 best beam [15] –> 1111 (4 bits)
    o 5 Differential Offsets [12, 10, 7, 5, 3]
        [15-12, 12-10, 10-7, 7-5, 5-3]=[3, 2, 3, 2, 2] –> [3, 2, 3, 2, 2]
5*2 bits When Reporting Configuration is "10"

When the reporting configuration is "10", there may be correlation and correlated beams may have a plurality of crests as described above. For example, when the measurement levels of the M best beams show that the beams have weak correlation where multiple crests exist, beam information reporting may be performed based on the above reporting configuration. For example, assuming the indices of best beams are [3, 12, 4, 11, 2, 13] and the measurement levels thereof are [13, 12, 11, 11, 10, 10], a distribution may be formed such that double crests are formed with respect to indices 3 and 12 as shown in Table 6 below. The same method may be applied when the number of crests are greater than or equal to 2.

Specifically, referring to Table 6, beam IDs of 3 and 12 may be reported as double-crest beams. In this case, 13-12=1 may be reported as a relative differential offset value between the crest beams.

For example, all beam IDs may be reported. In this case, relative differential offset values with respect to the first best beam may be reported as shown in Table 6 below.

TABLE 6

- Beam indices: [3, 12, 4, 11, 2, 13]
    o Alt 1: Multiple grouping (double crests)
        Only crest beams are transmitted –> [3, 12, , , , ] Beam id 5bits*2
    o Alt 2: All
        All beam IDs: Each beam ID is 5 bits
        (Selection of Alt 1 or Alt 2 may be determined by BS or predefined for UE)
- Reporting [13, 12, 11, 11, 10, 10]
    Alt 1: Double grouping
        First best beam [13] –> 4 bits
        Crest beam relative differential offset [12]: [13-12] –> [1], 2 bits
    Alt 2: All
        First best beam [13] –> 4 bits
        Relative differential offset [12]:
        [12, 11, 11, 10, 10] –> [1, 1, 0, 0, 0] , 5*2 bits When Reporting Configuration is "11"

When the reporting configuration is "11", there may be correlation and correlated beams may have a single crest as described above.

For example, assuming the indices of 6 best beams are [7, 6, 8, 9, 5, 10] and the measurement levels thereof are [13, 12, 11, 11, 10, 10], the following values shown in Table 7 below may be transmitted.

Specifically, referring to Table 7, a beam ID of 7 may be reported as a single crest beam.

For example, all beam IDs may be reported. In this case, relative differential offset values with respect to the first best beam may be reported as shown in Table 7 below.

TABLE 7

- Beam indices: [7, 6, 8, 9, 5, 10]
    o Alt 1: Grouping
        Only crest beam is transmitted [7, , , , , ] Beam ID 5bits
    o Alt 2: All
        All beam IDs: Each beam ID is 5 bits
Selection of Alt 1 or Alt 2 may be determined by BS or predefined for UE
- Reporting [13, 12, 11, 11, 10, 10]
    o Alt 1: Grouping
        First best beam [13] –> 4 bits
    o Alt 2: All
        First best beam [13]: 4 bits
        Relative differential offset [12]:
        [12, 11, 11, 10, 10] –> [1, 1, 0, 0, 0], 5*2 bits Upon receiving a beam reporting value related to the above-described reporting configuration (two bits) from the UE, the BS may decode the reporting configuration. By doing so, the BS may check the reporting configuration transmitted from the UE. For example, when the reporting configuration set to "00" is transmitted, the BS may recognize that it is a report on differential offsets and then restore information on each beam using the differential offsets based on beam IDs and best beams. For example, the BS may restore reporting information on beams as shown in Equation 3.

Beam measurement value=best beam measurement−differential offset value     [Equation 3]

When the reporting configuration set to "01" is transmitted, the BS may recognize that it is a report on relative differential offsets and then perform restoration using the differential offsets based on beam IDs and best beams. For example, the BS may restore reporting information on beams as shown in Equation 4.

$k$-th beam measurement value=($k$−1)-th best beam measurement−relative differential offset value     [Equation 4]

When the reporting configuration set to "10" is transmitted, the BS may recognize weak beam correlation where there are a plurality of crests (double crests in the embodiment). The selection of Alt 1 or Alt 2 in Table 6 may be preconfigured by the BS or UE In the case of Alt 1 of Table 6, since multiple beam IDs with multiple crests and multiple reporting values are reported using relative differential offsets, these values may be preferentially restored. In Table 6, the beam ID of a beam at the first crest is 3, and the measurement value thereof is 13. The beam ID of a beam at the second crest is 12, and the measurement value thereof is 12. The BS may restore information on the two beams as described above. Additionally, the BS may select two beams around each of beams 3 and 12 as the best beam. In the above-described embodiment regarding double crests, the two groups may correspond to [3, 1, 2] and [12, 11, 13], respectively. However, the present disclosure is not limited thereto. That is, the present disclosure is applicable to a plurality of crests.

In the case of Alt 2 in Table 6, since all relative differential offsets are reported, all beams with double crests may be restored. In this case, the method when relative differential offsets are used may be equally applied. As described in Table 6, the beam IDs of [3, 12, 4, 11, 2, 13] and the measurement levels of [13, 12, 11, 11, 10, 10] may be checked.

When the reporting configuration set to "11" is transmitted, the BS may recognize strong beam correlation with a single crest. The BS may perform restoration according to Alt 1 or Alt 2 in Table 7. The selection of Alt 1 or Alt 2 in Table 6 may be preconfigured by the BS or UE, but the present disclosure is not limited thereto.

In the case of Alt 1 of Table 7, the ID of a transmitted beam may be 7, and the measurement value thereof may be 7. In the case of Alt 2, the IDs of transmitted beams may be [7, 6, 8, 9, 5, 10], and the measurement values thereof may be [13, 1, 1, 0, 0, 0].

When Alt 1 is selected, since one representative beam ID with the single crest (beam 7) and one reporting value are transmitted, the BS may need to select additional best beams. Specifically, the BS may additionally select five beams around beam 7. That is, a beam group of [7, 4, 5, 6, 8, 9] may have a single crest.

In the case of Alt 2, relative differential offsets for all beams with a single crest may be reported according to relative differential offset reporting, and restoration may be performed based thereon. The reported beam IDs may be [7, 6, 8, 9, 5, 10], and the measurement levels thereof may be [13, 12, 11, 11, 10, 10].

Figure 11:
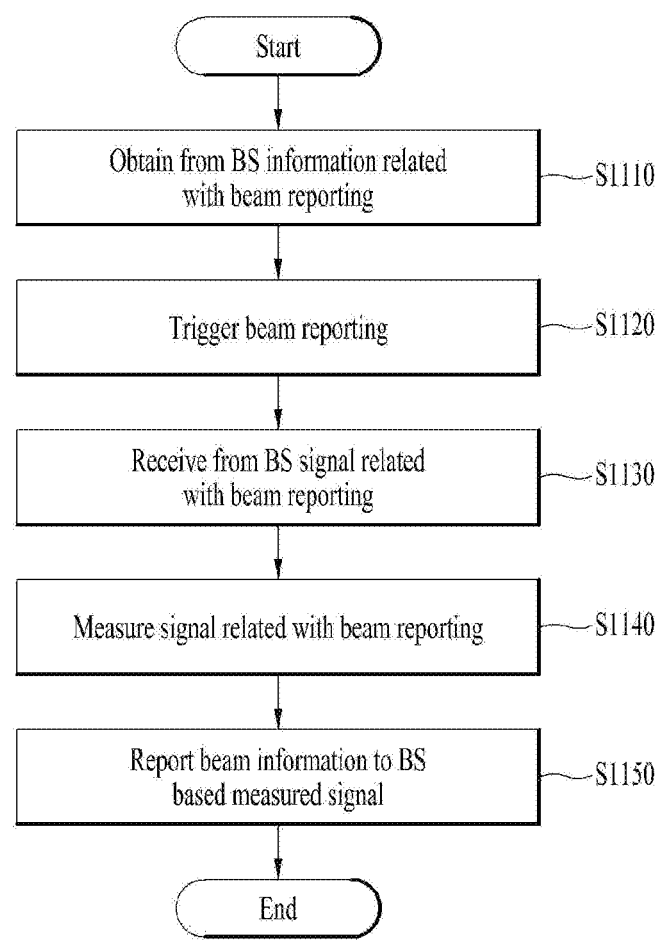
FIG. 11 is a diagram illustrating a beam reporting method.

FIG. 11 is a diagram illustrating a method for a UE to report beam information.

The UE may obtain information related with beam reporting from a BS (S1110). As described above with reference to FIGS. 1 to 10, the BS may share the information related with beam reporting with the UE. The BS may provide the information related with beam reporting to the UE through an SIB or a higher layer signal. For example, the information related with beam reporting may correspond to information about a beam reporting mechanism as described above.

The UE may trigger beam reporting (S1120). As described above with reference to FIGS. 1 to 10, the BS may allow the UE to trigger the beam reporting using system information or a control signal. Upon receiving the system information or control signal, the UE may trigger the beam reporting as described above.

The UE may receive a signal related with beam reporting from the BS (S1130). As described above with reference to FIGS. 1 to 10, the signal related with beam reporting may be an RS. For example, the RS may include a beam RS, a CSI-RS, or other types of RSs, but the present disclosure is not limited thereto.

The UE may measure a signal related with beam reporting (S1140). As described above with reference to FIGS. 1 to 10, the UE may measure each beam based on the RS. For example, the UE may perform measurement based on each beam index. The UE may configure a reporting configuration based on measured signals The UE may report beam information to the BS based on the measured signal (S1150). As described above with reference to FIGS. 1 to 10, the UE may report the reporting configuration as well as the beam information to the BS. The reporting configuration may be configured with two bits, and thus the reporting configuration may be set to one of "00, 01, 10, and 11". The UE may determine the reporting configuration based on the measurement value of each beam. When the reporting configuration has a first value (00), the beam information may include information of all measurement values on the first beam among best beams, and information on other beams except the first beam among the best beams may include differential offset information based on differences from the first beam. As described above, the first beam may correspond to a representative beam. For example, the first beam may correspond to a beam with the highest measurement value, but the present disclosure is not limited thereto. In the case, as described above, an original measurement value may be reported for the first beam, and only offset values based on the differences from the first beam may be reported for the other beams.

When the reporting configuration has a second value (01), the beam information may include information of all measurement values on the first beam among the best beams, and information on other beams except the first beam among the best beams may include only relative differential offset information based on differences between adjacent beams. As described above, this reporting configuration may be applied when a difference between beams is small. For the second beam adjacent to the first beam, a differential offset value with respect to the first beam may be reported. For the third beam, a differential offset value with respect to the second beam may be reported. In this way, a differential offset value with respect to an (M−1)-th beam may be reported for an M-th beam.

When the reporting configuration has a third value (10), the measurements of all available beams may have a distribution with a plurality of crests, and the beam information may include information on only beams corresponding to the crests. In this case, the measurement values of all the available beams may be distributed based on beam indices, and each of the beams corresponding to the crests may have a higher measurement value than beams with adjacent beams indices on both sides. For example, the crest may mean a section in which the measurement value is higher than other values in the vicinity thereof. That is, the crest may refer to the peak of a distribution. This structure is illustrated in FIG. 10. When the measurement value of a beam with a K-th index is higher than those of beams with (K−1)-th and (K+1)-th indices, the beam with the K-th index may be in the crest. In this case, the UE may report the beam information to the BS according to Alt 1 or Alt 2. The BS may restore the beam information based on the reporting configuration as described above.

When the reporting configuration has a fourth value (11), the measurement values of all available beams may have a distribution with a single crest, and the beam information may include information on only a beam corresponding to the crest, which has the highest measurement value. The distribution with the single crest is illustrated in FIG. 9. This reporting configuration may be applied when the measurement values of adjacent beams may be smaller than the highest measurement value.

The embodiments of the present disclosure may be implemented through various means. For example, the embodiments may be implemented by hardware, firmware, software, or a combination thereof.

When implemented by hardware, a method according to the embodiments of the present disclosure may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

In the case of implementation by firmware or software, a method according to the embodiments of the present disclosure may be implemented by modules, procedures, and/or functions for performing the above-explained functions or operations. Software code is stored in a memory unit and is then drivable by a processor. The memory unit is provided within or outside the processor to exchange data with the processor through the various means known to the public.

The detailed description of the preferred embodiments of the present disclosure has been given to enable those skilled in the art to implement and practice the disclosure. Although the disclosure has been described with reference to the preferred embodiments, those skilled in the art will appreciate that various modifications and variations can be made in the present disclosure without departing from the spirit or scope of the disclosure described in the appended claims. Accordingly, the disclosure should not be limited to the embodiments described herein but should be accorded the broadest scope consistent with the principles and novel features disclosed herein. It will be apparent that, although the preferred embodiments have been shown and described above, the present specification is not limited to the above-described specific embodiments, and various modifications and variations can be made by those skilled in the art to which the present disclosure pertains without departing from the gist of the appended claims. Thus, it is intended that the modifications and variations should not be understood independently of the technical spirit or prospect of the present specification.

The embodiments of both the method and apparatus have been described in this document, and if necessary, the descriptions thereof may be complementarily applied.

INDUSTRIAL APPLICABILITY

The present disclosure is applicable to various wireless communication systems including not only IEEE 802.16x and IEEE 802.11x systems as well as the 3GPP LTE and LTE-A systems.

The invention claimed is:

1. A method for reporting beam information by a user equipment (UE) in a wireless communication system, the method comprising:
   obtaining, from a base station (BS), information for triggering beam reporting;
   triggering beam reporting based on the information for triggering beam reporting;
   receiving, from the BS, a signal related to beam reporting;
   measuring the signal related to beam reporting; and
   based on a result of the measurement, reporting, to the BS, the beam information including information about one or more best beams among all available beams,
   wherein the beam information is reported based on a reporting configuration with 2 bits,
   wherein the reporting configuration is reported with the beam information, and
   wherein the reporting configuration is used for restoring the beam information by the BS.

2. The method of claim 1, wherein based on the reporting configuration having a first value, the beam information includes information of all measurement values on a first beam among the one or more best beams, and information on beams other than the first beam among the one or more best beams includes only differential offset information based on differences from the first beam.

3. The method of claim 1, wherein based on the reporting configuration having a second value, the beam information includes information of all measurement values on a first beam among the one or more best beams, and information on beams other than the first beam among the one or more best beams includes only relative differential offset information based on differences between adjacent beams.

4. The method of claim 1, wherein based on the reporting configuration having a third value, measurement values of all the available beams have a distribution with a plurality of crests, and the beam information includes information on only beams corresponding to the crests.

5. The method of claim 4, wherein the measurement values of all the available beams are distributed based on beam indices, and wherein each of the beams corresponding to the crests has a higher measurement value than beams with adjacent beams indices on both sides of the respective beam.

6. The method of claim 1, wherein based on the reporting configuration having a fourth value, measurement values of all the available beams have a distribution with a single crest, and the beam information includes information on only a beam corresponding to the crest, and
wherein the beam corresponding the crest has a highest measurement value.

7. The method of claim 1, wherein a total number of the available beams and a number of the one or more best beams are indicated by the information—for triggering beam reporting.

8. The method of claim 1, wherein the information for triggering beam reporting is information about a beam reporting mechanism, and
wherein the UE obtains the information for triggering beam reporting in a system information block (SIB) or a higher layer signal.

9. The method of claim 1, wherein the signal related to beam reporting is either a beam reference signal or a channel state information reference signal (CSI-RS).

10. A user equipment (UE) configured for reporting beam information in a wireless communication system, the UE comprising:
a receiver configured to receive a signal;
a transmitter configured to transmit a signal; and
a processor configured to control the receiver and the transmitter,
wherein the processor is further configured to:
obtain, from a base station (BS), information for triggering beam reporting;
trigger beam reporting based on the information for triggering beam reporting;
receive, from the BS, a signal related to beam reporting;
measure the signal related to beam reporting; and
based on a result of the measurement, report, to the BS, the beam information including information about one or more best beams among all available beams,
wherein the beam information is reported based on a reporting configuration with 2 bits,
wherein the reporting configuration is reported with the beam information, and
wherein the BS restores the beam information based on the reporting configuration.

11. The UE of claim 10, wherein based on the reporting configuration having a first value, the beam information includes information of all measurement values on a first beam among the one or more best beams, and information on beams other than the first beam among the one or more best beams includes only differential offset information based on differences from the first beam.

12. The UE of claim 10, wherein based on the reporting configuration having a second value, the beam information includes information of all measurement values on a first beam among the one or more best beams, and information on beams other than the first beam among the one or more best beams includes only relative differential offset information based on differences between adjacent beams.

13. The UE of claim 10, wherein based on the reporting configuration having a third value, measurement values of all the available beams have a distribution with a plurality of crests, and the beam information includes information on only beams corresponding to the crests.

14. The UE of claim 13, wherein the measurement values of all the available beams are distributed based on beam indices, and wherein each of the beams corresponding to the crests has a higher measurement value than beams with adjacent beams indices on both sides of the respective beam.

15. The UE of claim 10, wherein based on the reporting configuration having a fourth value, measurement values of all the available beams have a distribution with a single crest, and the beam information includes information on only a beam corresponding to the crest, and
wherein the beam corresponding the crest has a highest measurement value.

16. The UE of claim 10, wherein a total number of the available beams and a number of the one or more best beams are indicated by the information—for triggering beam reporting.

17. The UE of claim 10, wherein the information for triggering beam reporting is information about a beam reporting mechanism, and
wherein the UE obtains the information for triggering beam reporting in a system information block (SIB) or a higher layer signal.

18. The UE of claim 10, wherein the signal related to beam reporting is either a beam reference signal or a channel state information reference signal (CSI-RS).

* * * * *